Sept. 12, 1933.  A. C. FISCHER  1,926,895
PAVEMENT MARKING DEVICE
Filed Dec. 23, 1926
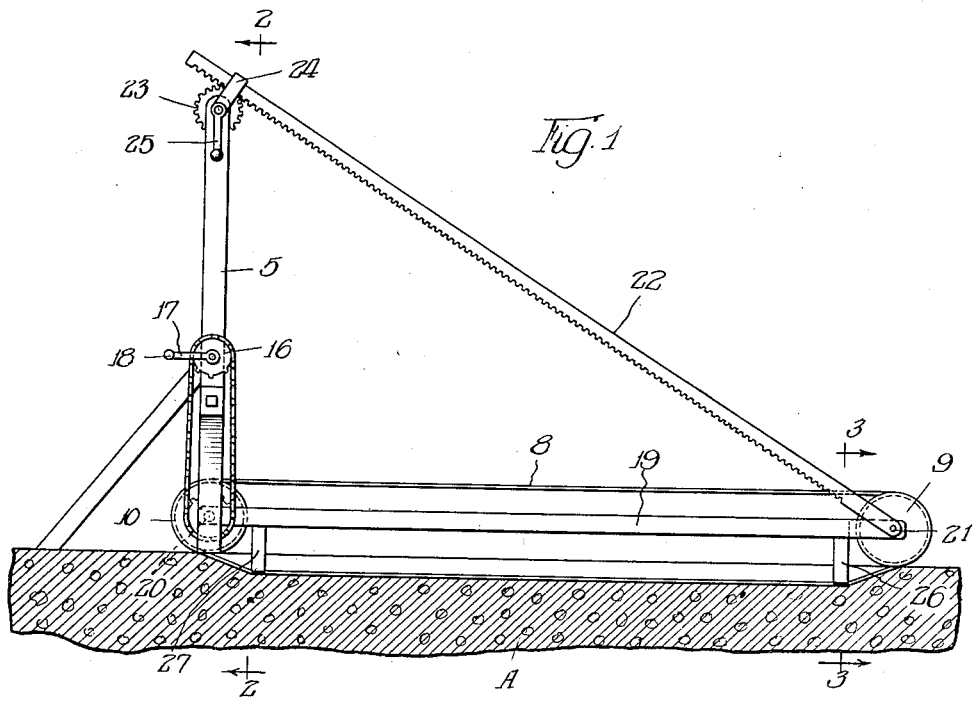
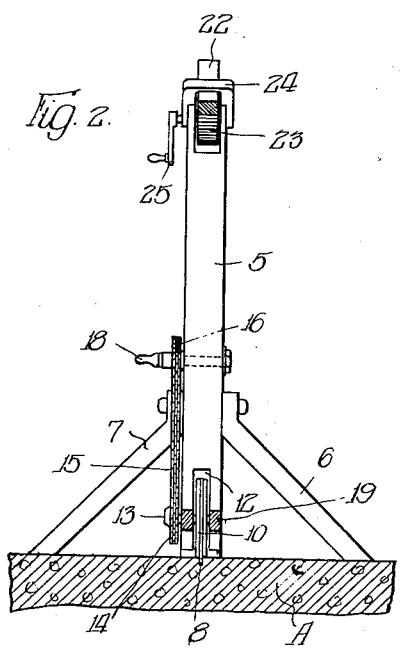
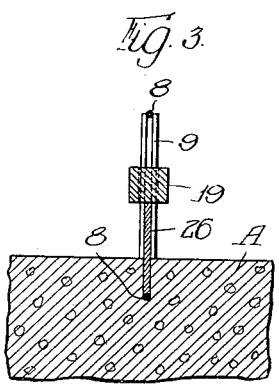
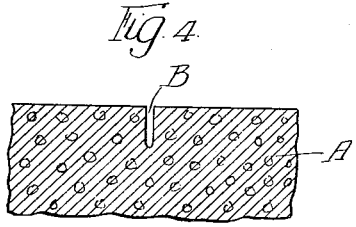
Inventor:
Albert C. Fischer Patented Sept. 12, 1933

1,926,895

UNITED STATES PATENT OFFICE 1,926,895

PAVEMENT MARKING DEVICE

Albert C. Fischer, Chicago, Ill., assignor to The Philip Carey Manufacturing Company, a corporation of Ohio Application December 23, 1926
Serial No. 156,697

12 Claims. (Cl. 94—45)

My invention relates in general to paving projects and has particular reference to an apparatus for marking the surface of pavements, highways and the like, primarily for the purpose of making a line of weakness so that upon expansion and contraction of the concrete the resultant cracks will be controlled to such an extent that they will not be distributed throughout the surface of the concrete, but on the other hand along certain lines of division which will preserve the pavement and otherwise prevent the same from deteriorating as rapidly as in the absence of a marking.

The preferred embodiment in the apparatus is illustrated in the accompanying drawing, in which Figure 1 is a view in side elevation of the apparatus illustrating the application of the same.

Figure 2 is a vertical section on the line 2—2 of Figure 1.

Figure 3 is a vertical section on the line 3—3 of Figure 1; and

Figure 4 is a view in section showing the cut in the surface of the paving made by the apparatus.

Referring now to the drawing in detail. A represents a section of ordinary paving in the surface of which a cut or line of weakness B (see Fig. 4) is made. The device or apparatus for devising this cut or line of weakness preferably consists of a portable framework, comprising the vertical standard or post 5 suitably supported by braces 6 and 7, which are secured to the post above the ground level thereof, and with the lower end of the post making up a modified tripart structure. By these means the apparatus may be supported adjacent the paving A in position to become manually operated in a manner to be hereinafter described.

The actual marking of cuts in the pavement is preferably produced by an endless wire marking cable or the like 8, which is stretched between pulleys or rolls 9 and 10, one of which, viz, the pulley 10, being mounted with freedom of rotation within a slot 12 in the lower end of the post 5. This pulley 10 is provided with a spindle 13, carrying a relatively small sprocket wheel 14, around which is passed a sprocket chain 15 connecting the elevated sprocket wheel 16 in driving relation with the pulley 10. The sprocket wheel 16 is adapted to be manually actuated by a rotary crank 17 having a hand grip 18 on the end thereof. The spaced relation of the pulleys 9 and 10 is affected by a horizontal frame structure made up for the most part by a boom 19, one end of which is pivoted as at 20 co-axially with the pulley 10, and the opposite end is bifurcated, and with the pulley 9 mounted with freedom of rotation in the bifurcation, with a suitable pin 21 being provided for this purpose. Pivotally connected to the extending end of the boom 19 is a toothed elevating rack 22 having the teeth meshing with a pinion 23, which is mounted in the upper end of the post 5. A suitable strap 24 holds the rack in engagement with the pinion 23, so that by manually rotating the pinion by the crank 25 the horizontal boom 19 may be elevated and lowered with respect to the paving surface.

In using the apparatus, just as soon as the concrete has set to a predetermined degree so that it is ready to be marked, the apparatus will be moved adjacent to the paving and the post 5 set up on the edge of the same. By turning the crank 25 the boom may be lowered over the paving so that the endless wire marking cable 8 contacts therewith, in fact it should be imbedded therein for a shallow depth in order to make the cut deep enough to be effective for the purpose described. The imbedding of the marking cable may be realized by using a pair of guides 26 and 27 in order to space the cable a sufficient distance below the plane of the pulleys 9 and 10. By turning the crank 17 the cable will be caused to travel around the pulleys 9 and 10 and develop a slicing action in the paving surface for a depth substantially as that shown. After the marking or cut has been produced the cable may be moved out of contact with the paving surface by utilizing the elevating mechanism, and the apparatus may then be transferred to another location for producing the cuts or marking at spaced intervals in the pavement.

I claim:

1. In an apparatus for jointing a plastic surface, a post, a boom projecting therefrom, marking means carried by the boom, and means for actuating the marking means relative to said boom.

2. In an apparatus for jointing a plastic surface, a post, a boom pivoted to the post and projecting therefrom, marking means carried by the boom, means for elevating the projecting end of the boom, and means on the post for actuating the marking means.

3. In an apparatus for jointing a plastic surface, a post, a boom pivoted to the post and projecting therefrom, an endless wire marking cable carried by the boom, means for elevating the projecting end of the boom, and means on the post for actuating the endless wire marking cable substantially as/and for the purpose described.

4. In an apparatus for jointing a plastic surface, a post, a pulley mounted to the post, a boom pivoted to the post and projecting therefrom, a pulley carried by the boom near the projecting end thereof, an endless wire marking cable passing around the said pulleys and actuating means for the cable.

5. In an apparatus for jointing a plastic surface, a post, a pulley mounted to the post, a boom pivoted to the post and projecting therefrom, a pulley carried by the boom near the projecting end thereof, an endless wire marking cable passing around the said pulleys and actuating means for the cable, comprising means connected in drawing relation with the pulley on the post.

6. In an apparatus for jointing a plastic surface, a post, a pulley mounted to the post, a boom pivoted to the post and projecting therefrom, a pulley carried by the boom near the projecting end thereof, an endless wire marking cable passing around the said pulleys and actuating means for the cable, comprising a sprocket wheel mounted in drawing relation with the pulley in the post and manually actuated means for drawing said sprocket wheel.

7. In an apparatus for jointing a plastic surface, a post, a pulley mounted to the post, a boom pivoted to the post and projecting therefrom, a pulley carried by the boom near the projecting end thereof, an endless wire marking cable passing around the said pulleys and actuating means for the cable, comprising a driven sprocket wheel mounted in driving relation with the pulley in the post, a driving sprocket on the post in spaced relation to the driven sprocket wheel, a sprocket chain connecting said sprocket wheels and manually actuated means for the driving sprocket wheel.

8. The combination as set forth in claim 4, and in which the post is equipped with means for elevating the boom to a position other than horizontal.

9. The combination as set forth in claim 7 and in which the post is equipped with means for elevating the boom to a position other than horizontal.

10. In a device for jointing a plastic surface, the combination with a frame, of rotatable means carried by said frame for supporting a linear marking means, and means on said frame to impart movement to said linear marking means relative to said frame.

11. An apparatus for jointing plastic surfaces comprising a frame movable over plastic material, joint producing means, and rotatable means supporting said joint producing means from the frame for movement longitudinally of the frame.

12. An apparatus for jointing plastic surfaces comprising a frame movable over the surface to be jointed, joint producing means, rotatable guiding means for said joint producing means, and means for actuating the joint producing means along said guiding means.

ALBERT C. FISCHER.